US010989523B2

(12) United States Patent
Georgeson et al.

(10) Patent No.: US 10,989,523 B2
(45) Date of Patent: Apr. 27, 2021

(54) SUB-SURFACE PATTERNING FOR DIFFRACTION-BASED STRAIN MEASUREMENT AND DAMAGE DETECTION IN STRUCTURES

(71) Applicant: The Boeing Company, Chicago, IL (US)

(72) Inventors: Gary E. Georgeson, Tacoma, WA (US); Kenneth H. Griess, Kent, WA (US); Russell L. Keller, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/353,377

(22) Filed: Mar. 14, 2019

(65) Prior Publication Data
US 2020/0292302 A1 Sep. 17, 2020

(51) Int. Cl.
G01B 11/16 (2006.01)

(52) U.S. Cl.
CPC .................. G01B 11/165 (2013.01)

(58) Field of Classification Search
CPC ..... G01L 1/18; G01L 5/16; G01L 1/22; G01L 1/26; G01L 1/2287; G01L 1/16; G01L 1/14; G01L 5/161; G01L 1/205; G01L 1/2293; G01L 1/00; G01L 1/142; G01L 1/20; G01L 1/12; G01L 1/2206; G01L 1/2262; G01L 1/005; G01L 1/04; G01L 1/122; G01L 1/144; G01L 1/148; G01L 1/2243; G01L 1/242; G01L 3/101; G01L 3/108; G01L 5/0028; G01L 5/0061; G01L 5/162; G01L 5/166; G01L 5/22; G01L 5/225; G01L 9/04; G01L 17/005; G01L 19/0092; G01L 19/143; G01L 1/042; G01L 1/044; G01L 1/048; G01L 1/10; G01L 1/146; G01L 1/162; G01L 1/183; G01L 1/225;
(Continued)

(56) References Cited

U.S. PATENT DOCUMENTS 4,142,774 A * 3/1979 Wright .................. G01B 11/16
385/10
5,012,090 A 4/1991 Spillman, Jr.
(Continued)

OTHER PUBLICATIONS

Office Action for related European Application No. 20160159.8; report dated Aug. 12, 2020.

Primary Examiner — Michael P Stafira
(74) Attorney, Agent, or Firm — von Briesen & Roper, s.c.

(57) ABSTRACT

Systems and methods for assessing strain in structural components are disclosed. Structural components may have geometric patterns of grooves within the structural component, with the grooves in the geometric pattern each having a groove width. The method may include projecting beams of electromagnetic (EM) energy through the structural component to the geometric pattern of grooves to create diffracted beams of EM energy that are reflected from or transmitted through the geometric pattern of grooves and have diffracted wavelengths indicating changes in the groove widths due to strain caused when the structural component is exposed to environmental conditions, detecting the diffracted wavelength of the diffracted beams, and correlating the diffracted wavelengths of the diffracted beams to the strain in the structural components.

20 Claims, 8 Drawing Sheets

(58) Field of Classification Search
CPC ....... G01L 1/2268; G01L 1/246; G01L 25/00;
G01L 3/08; G01L 3/14; G01L 3/1435;
G01L 5/00; G01L 5/0052; G01L 5/009;
G01L 5/165; G01L 5/223; G01L 5/226;
G01L 9/0019; G01L 9/0022; G01L
9/0047; G01L 9/0048; G01L 9/0054;
G01L 9/12; G01L 11/025; G01L 13/00;
G01L 19/086; G01B 7/16; G01B 7/18;
G01B 7/22; G01B 11/25; G01B 11/2513;
G01B 7/003; G01B 7/20; G01B 7/30;
G01B 11/18; G01B 11/165; G01B 11/16;
G01B 11/161; G01B 21/32; G01J
2003/104; G01J 2003/106; G01J
2003/2813; G01J 3/00; G01J 3/0229;
G01J 3/027; G01J 3/0278; G01J 3/10;
G01J 3/2803; G01J 3/2823; G01N
2021/3129; G01N 2021/4797; G01N
21/01; G01N 21/255; G01N 21/31; G01N
21/4795; G01N 21/85; G01N 2203/003;
G01N 2203/0286; G01N 2203/0617;
G01N 3/42; G01N 2021/4711; G01N
2021/4735; G01N 2021/479; G01N
2021/4792; G01N 2021/8411; G01N
2033/0095; G01N 21/4788; G01N
21/9515; G01N 2201/06113; G01N
2201/0634; G01N 2201/0638; G01N
2333/902; G01N 2520/00; G01N
27/4141; G01N 27/4143; G01N 27/4145;
G01N 27/44791; G01N 2800/368; G01N
2800/7009; G01N 33/573; G01N
33/6818; G01N 33/689; G01N 33/84;
G02B 6/02076; G02B 6/0208; G02B
6/022; G02B 6/02209; G02B 2027/0138;
G02B 2027/014; G02B 2027/0178; G02B
2027/0187; G02B 27/0093; G02B 27/017;
G02B 27/0172; G02B 6/02; G02B
6/02042; G02B 6/02128; G02B 6/02138;
G02B 6/02142; G02B 6/0229; G02B
6/02347; G02B 6/06; G02B 6/29319;
G02B 6/4215; G02B 6/4231; G02B
6/4266; G02B 6/4401; G02B 6/4405;
G02B 6/4415; G02B 6/4471

See application file for complete search history.

(56) References Cited

U.S. PATENT DOCUMENTS

| | | |
|---|---|---|
| 5,399,854 A | 3/1995 | Dunphy |
| 5,430,817 A | 7/1995 | Vengsarkar |
| 5,760,391 A | 6/1998 | Narendran |
| 2002/0037135 A1 | 3/2002 | Atieh |
| 2003/0026190 A1 | 2/2003 | Hendriks |
| 2003/0142319 A1 | 7/2003 | Ronnekleiv |
| 2006/0071158 A1 | 4/2006 | Van Der Spek |
| 2008/0151219 A1 | 6/2008 | Maris |
| 2011/0226070 A1 | 9/2011 | Berendes |
| 2011/0316712 A1 | 12/2011 | McIver et al. |
| 2012/0325009 A1 | 12/2012 | Chung |
| 2015/0308907 A1 | 10/2015 | Georgeson et al. |
| 2016/0249809 A1 | 9/2016 | Ou-Yang |
| 2017/0052152 A1 | 2/2017 | Tat et al. |
| 2017/0276614 A1 | 9/2017 | Bovero et al. |
| 2018/0038744 A1 | 2/2018 | Winter et al. |

* cited by examiner

SUB-SURFACE PATTERNING FOR DIFFRACTION-BASED STRAIN MEASUREMENT AND DAMAGE DETECTION IN STRUCTURES

TECHNICAL FIELD

The present disclosure relates generally to non-destructive inspection (NDI) of structural components and, more particularly, to systems and methods for detecting strain in structural components caused by exposure to environmental conditions utilizing geometric patterns of grooves within the structural components that diffract nonvisible electromagnetic (EM) energy to produce detectable variations in the wavelength of EM energy reflected or transmitted from the grooves, indicating strains in the structural components.

BACKGROUND

Many mechanical systems, such as commercial vehicles, manufacturing equipment, and other industrial systems, may be exposed to particularly energetic environmental conditions, such as vibration, temperature extremes, impacts and mechanical stresses. For example, even when on the ground, aircraft may be exposed to significant stresses during cargo loading and unloading, as well as impacts from support vehicles and ground support equipment. During flight, stresses and/or impacts may result during take-off and landing, from shifting or improperly secured cargo, from impacts with objects during flight, and the like. In addition, some structural components may experience thermal stresses when exposed to high temperatures. Some composite materials, for example, may be affected by thermal degradation, which may compromise the mechanical properties of the composite, including flexural strength, compression after impact, and inter-laminar shear strength, among others.

It is therefore common for selected components of various industrial systems to be routinely inspected and evaluated during the operational lifetime of the component. The integrity of one or more structural components may be compromised without an accompanying visually detectable indication of the effect of environmental conditions on the components. Accordingly, needs exist for non-destructive inspection techniques that can indicate cumulative effects on structural components after being exposed to environmental conditions such as repetitive loading, impacts, high temperatures and the like during operation. Such indications may lead to the scheduling of further evaluation, maintenance and/or replacement of the structural components at appropriate times.

SUMMARY OF THE DISCLOSURE

In one aspect of the present disclosure, a multi-layer structural component is disclosed. The multi-layer structural component may include a first outer layer, a second outer layer, and a first patterned layer disposed between the first outer layer and the second outer layer. The first patterned layer may include a first geometric pattern of grooves on a first surface of the first patterned layer, with the first geometric pattern of grooves having a first set of grooves each having a first groove width. A first projected beam of EM energy having a first wavelength corresponding to the first groove width may be diffracted when the first projected beam of EM energy hits the first set of grooves and creates a first diffracted beam of diffracted EM energy having a first diffracted wavelength indicating changes in the first groove width due to strain caused when the multi-layer structural component is exposed to an environmental condition. At least one of the first outer layer and the second outer layer may be fabricated from an outer layer material that is transparent with respect to the first projected beam of EM energy and the first diffracted beam of diffracted EM energy.

In another aspect of the present invention, an inspection system for assessing strain in a structural component is disclosed. The inspection system may include a first geometric pattern of grooves within the structural component having a first set of grooves each having a first groove width, and a first EM energy source projecting a first projected beam of electromagnetic energy at a first wavelength that corresponds to the first groove width. When the first projected beam of EM energy is projected onto the structural component, the first projected beam of EM energy passes through the structural component to the first geometric pattern of grooves, and is diffracted by the first set of grooves to create a first diffracted beam of diffracted EM energy having a first diffracted wavelength indicating changes in the first groove width due to the strain caused when the structural component is exposed to an environmental condition. The inspection may further include an EM energy detector detecting the first diffracted wavelength of the first diffracted beam of diffracted EM energy from the first set of grooves as the first EM energy source projects the first projected beam of EM energy onto the structural component, and a processor operatively connected to the EM energy detector and configured to receive the first diffracted wavelength of the first diffracted beam of diffracted EM energy from the EM energy detector and to correlate the first diffracted wavelength to the strain in the structural component.

In a further aspect of the present disclosure, a method for assessing strain in a structural component is disclosed. The structural component may have a first geometric pattern of grooves within the structural component, the first geometric pattern of grooves having a first set of grooves each having a first groove width. The method for assessing strain may include projecting a first projected beam of EM energy through the structural component to the first geometric pattern of grooves, wherein the first projected beam of EM energy has a first wavelength that corresponds to the first groove width, and wherein the first set of grooves diffracts the first projected beam of EM energy to create a first diffracted beam of diffracted EM energy having a first diffracted wavelength indicating changes in the first groove width due to strain caused when the structural component is exposed to an environmental condition. The method for assessing strain may further include detecting the first diffracted wavelength of the first diffracted beam of diffracted EM energy from the first set of grooves as the first projected beam of EM energy is projected onto the structural component, and correlating the first diffracted wavelength of the first diffracted beam of diffracted EM energy from the first geometric pattern of grooves to the strain in the structural component.

Additional aspects are defined by the claims of this patent.

BRIEF DESCRIPTION OF THE DRAWINGS

FIGS. 7A-7G are plan views of embodiments of geometric patterns of grooves in accordance with the present disclosure for the structural component of FIG. 1;

DETAILED DESCRIPTION

Figure 1:
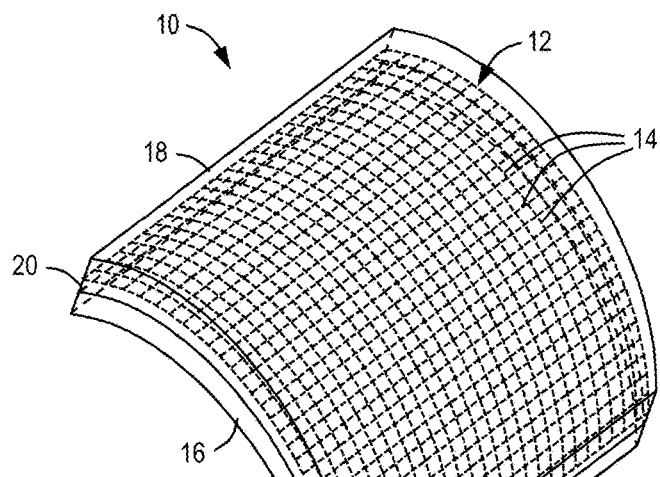
FIG. 1 is an isometric view of a structural component of a mechanical system having a geometric pattern of grooves in accordance with the present disclosure.
Figure 2:
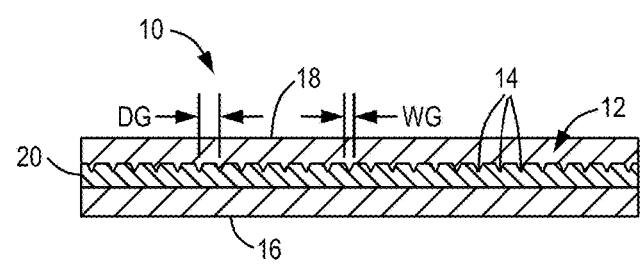
FIG. 2 is a partial cross-sectional view of the structural component of FIG. 1 having the geometric pattern of grooves.

FIGS. 1 and 2 are illustrations of a portion of a structural component 10 of a mechanical system that is configured for application of the NDI systems and methods illustrated and described herein. The structural component 10 may be any component of a mechanical system that will be subjected to environmental conditions that can cause stresses and strains to the structural component 10. For use in the NDI systems and methods of the present disclosure, the structural component 10 includes a geometric pattern 12 of grooves 14 formed within the interior of the structural component 10. In the illustrated embodiment, the structural component 10 has a multi-layer construction in which the geometric pattern 12 of grooves 14 is defined. The structural component 10 includes a first outer layer 16, a second outer layer 18, and a first patterned layer 20 disposed between the outer layers 16, 18. The geometric pattern 12 of grooves 14 is formed on a surface of the first patterned layer 20 that is covered by the second outer layer 18, thus concealing the geometric pattern 12 from view and from environmental elements that could scratch or otherwise damage the grooves 14.

FIG. 2 illustrates the structural component 10 of FIG. 1 in cross-section. The first patterned layer 20 is disposed on top of the first outer layer 16. The second outer layer 18 overlies the first patterned layer 20 and the geometric pattern 12 of grooves 14. The grooves 14 and the geometric pattern 12 are configured to create strain-sensitive detectable variations in the wavelength of EM energy reflected from or transmitted through the grooves 14 of the geometric pattern 12 in response to having EM energy outside the visible spectrum projected thereupon. The reflected or transmitted EM energy may be detected by an appropriate detector as discussed hereinafter, and the detectable variations in the wavelength and frequency of the reflected or transmitted EM energy can be determined by a processor and compared to baseline values for EM energy wavelengths expected when the structural component 10 has not been affected by stresses and strains cause by environmental conditions.

In the illustrated embodiment, the grooves 14 are arranged with a groove width WG and a groove spacing distance DG to create diffraction when EM energy having a corresponding wavelength is projected on the structural component 10. The wavelengths of the projected EM energy will typically be outside the visible range of approximately 400 nm to 750 nm unless the outer layers 16, 18 are fabricated from materials that are visually transparent to EM energy in the visible range. The diffraction of the applied EM energy creates the detectable variations in the diffracted wavelength of the reflected or transmitted EM energy that vary as the groove width WG changes due to strain in the structural component 10.

The groove width WG will determine an optimum spectral range of EM energy that can be applied to the geometric pattern 12. In general, the geometric pattern 12 will not diffract EM energy having a wavelength greater than two times the groove width WG. Examples of combinations of wavelengths, frequencies and groove widths WG that can be used in the system and methods of the present disclosure are as follows:

| EM Energy | Wavelength | Frequency | Groove Width WD |
|---|---|---|---|
| Ultraviolet | .2 μm-.4 μm | 750 THz-1,500 THz | .100 μm-.200 μm |
| Near Infrared | .75 μm-2.5 μm | 120 THz-400 THz | .375 μm-1.25 μm |
| Mid Infrared | 2.5 μm-15 μm | 20 THz-120 THz | 1.25 μm-7.5 μm |
| Far Infrared | 15 μm-1 mm | 300 GHZ-20 THz | 7.5 μm-.5 mm |
| THz Band | .1 mm-1 mm | 300 GHz-3 THz | .05 mm-.5 mm |
| Ultrasonic | .1 mm-5 mm | 60 GHz-3 THz | .05 mm-2.5 mm |
| Millimeter Wave Region | 1 mm-10 mm | 30 GHz-300 GHz | .5 mm-5 mm |
| Microwaves | 1 mm-30 cm | 1 GHz-300 GHz | .5 mm-15 cm |

The wavelength/groove width WG combination can be selected such that the geometric pattern 12 will reflect or transmit EM energy having a corresponding diffracted wavelength when the EM energy is applied and the structural component 10 is not subjected to strain causing the groove width WG to change. As the structural component 10 is subjected to environmental conditions causing strain, the diffracted wavelength of the reflected or transmitted EM energy from the geometric pattern 12 will progress through the EM energy spectrum to other diffracted wavelengths as the strain causes the groove widths WG to increase or decrease. Depending on the configuration of the structural component 10, the geometric pattern 12 and the environmental conditions to which the structural component 10 is exposed, changes in the groove width WG and corresponding changes in the diffracted wavelength may be uniform across the geometric pattern 12, or can be greater in some areas indicating greater stress and strain concentrations in those areas. An amount of strain and corresponding changing groove width WG and diffracted wavelength may be acceptable without the need for further inspection, while greater changes may indicate a need for further inspection, maintenance and/or replacement of the structural component 10. Those skilled in the art will understand that the initial groove width WG and the wavelength may be selected such that groove width WG does not increase beyond two times the wavelength before the structural component 10 experiences strain meriting further inspection.

The embodiment of the structural component 10 of FIGS. 1 and 2 illustrates configurations where the outer layers 16, 18 and the first patterned layer 20 are fabricated from different materials. The outer layer 16, 18 may be fabricated from composite materials, for example, that are transparent to the EM energy having wavelengths corresponding to the groove width WG of the grooves 14. The first patterned layer 20, on the other hand, may be fabricated from a material that is opaque relative to the wavelength of the EM energy. With this arrangement, EM energy of the appropriate wavelength transmitted from an EM energy source will pass through the second outer layer 18 without diffracting and will be diffracted by and reflected off the geometric pattern 12 on the first patterned layer 20 so that the diffracted wavelength can be detected by an appropriate EM energy detector.

As illustrated in FIGS. 1 and 2, the geometric pattern 12 of grooves 14 may cover the entire extent of the structural component 10, and the first patterned layer 20 may be approximately centered within the structural component 10. However, other configurations and locations for the geometric pattern 12 of grooves 14 are contemplated. For example, the geometric pattern 12 may be strategically positioned within the structural component 10 at locations providing the most relevant information regarding stress and strain on the structural component 10, such as in areas where high stress concentrations are to be expected. Such areas can include openings through the structural component 10 for wiring, piping, conduits and the like, corners, and bond lines where the structural component 10 is engaged by or attached to another component of the mechanical system or where a patch is applied to repair the structural component 10. In the latter areas, the layers 16-20 and the geometric pattern 12 can be configured so that the geometric pattern 12 is at or close to the intersection with the other component or the patch as long as the structural integrity of the connection and the mechanical system can be maintained.

Figure 3:
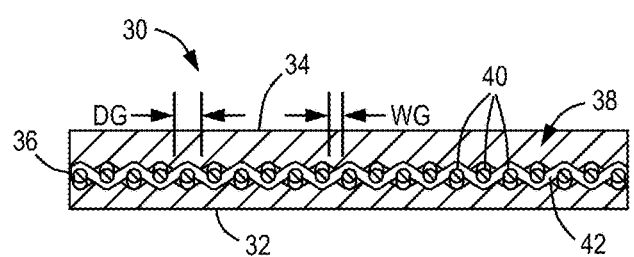
FIG. 3 is a partial cross-sectional view of an alternative embodiment of a structural component having an alternative geometric pattern of grooves.

Alternative configurations of structural components with geometric patterns of grooves can diffract EM energy and reflect or transmit the diffracted EM energy. FIG. 3 illustrates an alternative embodiment of a structural component 30 formed from a first outer layer 32, a second outer layer 34 and a first patterned layer 36 formed from a wire mesh, such as a wire mesh scrim 36 or a conductive scrim, that may also provide lightning strike protection or suppression in aircraft or other environments where the structural component 30 may be exposed to electrostatic discharges. The wire mesh scrim 36 may define a geometric pattern 38 and be formed by a first set of wires 40 oriented in a first direction and a second set of wires 42 oriented in a second direction, such as perpendicular to the first direction, that may be woven together. The wire spacing distances between the first set of wires 40 and the wire spacing distances between the second set of wires 42 and the thicknesses of the wires 40, 42 may define groove widths WG and groove spacing distances DG in the geometric pattern 38 as indicated in FIG. 3.

In some embodiments, the groove width WG and the groove spacing distance DG may be the same in both directions. In others, the wire thicknesses and spacing of the first set of wires 40 may be different than the wire thicknesses and spacing of the second set of wires 42 so that different wavelengths of EM energy will be diffracted by each set of wires 40, 42. Using this approach in an aircraft fuselage, for example, the first set of wires 40 may be configured to diffract EM energy in the near infrared band to indicate hoop stresses around the fuselage, and the second set of wires 42 may be configured to diffract EM energy in the far infrared band to indicate tensile stresses, compressive stresses or torsional stresses in the longitudinal direction of the fuselage. Depending on the stresses to be monitored, the sets of wires 40, 42 can be angled with respect to each other in orientations other than orthogonal as illustrated and described herein.

Having the grooves of the geometric pattern 38 being defined by the spaces between the wires 40, 42 offers flexibility in the location at which the diffracted EM energy can be detected. In one embodiment, the first outer layer 32 may be fabricated from a material that reflects the EM energy while the second outer layer 34 is fabricated from a material that is transparent to the EM energy. With this arrangement, an EM energy source and an EM energy detector may be positioned on the side of the second outer layer 34 of the structural component 30. EM energy transmitted by the EM energy source will pass through the second outer layer 34, be diffracted by the geometric pattern 38 formed by the sets of wires 40, 42, reflect off the first outer layer 32 and be detected by the EM energy detector. In an alternative embodiment, both outer layers 32, 34 may be fabricated from a material that is transparent to both the projected and the diffracted EM energy. With this arrangement, EM energy transmitted through one side of the structural component 30 will be diffracted at the geometric pattern 38 formed by the sets of wires 40, 42, and the diffracted EM energy will be transmitted through the opposite side of the structural component 30. This allows the EM energy source and the EM energy detector to be disposed on opposite sides of the structural component 30. This arrangement may be advantageous in limited access inspection situations. A beam of EM energy can be generated by an appropriately sized transmitter located within, or manually or automatically directed into, a hard-to-reach space, and the diffracted EM energy may be detected from the accessible side of the structural component 30. Of course, the positions of the EM energy source and the EM energy detector may be reversed depending on the requirements for a particular implementation.

Figure 4:
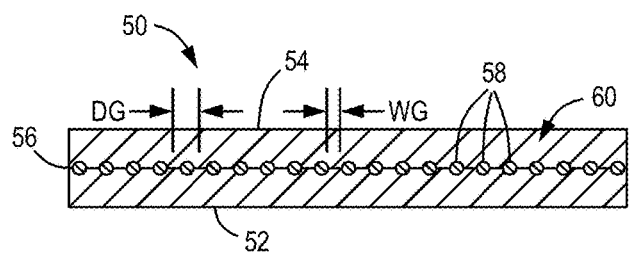
FIG. 4 is a partial cross-sectional view of a further embodiment of a structural component having a different geometric pattern of grooves.

FIG. 4 illustrates a further alternative of a structural component 50 in accordance with the present disclosure. In the structural component 50, a first outer layer 52 and a second outer layer 54 surround a first patterned layer 56 formed by a plurality of parallel wires 58, or rods 58, that define a geometric pattern 60. The wires 58 may be used for lightning strike protection as discussed above. Moreover, sturdier wires or rods 58 may be used as mini-rebar to provide additional support for the structural component 50. In a similar manner as the first set of wires 40, the size and spacing of the wires 58 can be varied to achieve a desired groove width WG and groove spacing distance DG, and thereby establish the EM energy wavelength to be used. Also, the materials used in the outer layers 52, 54 can be selected to either reflect the EM energy or allow the diffracted EM energy to be transmitted through the structural component 50.

It should be noted that various manufacturing methods may be used to fabricate the structural components 10, 30, 50 and other embodiments discussed herein. For example, the outer layers may be composite materials fabricated using known fabrication techniques. The patterned layers 20, 36, 56 may be metallic or other materials that will diffracted the EM energy, and may be added at the appropriate time and location as the composite material is laid out to form the structural components 10, 30, 50. In alternative processes, the structural components 10, 30, 50 may be fabricated using other additive manufacturing techniques such as three-dimensional (3D) printing. A 3D printer may be configured to dispense the different materials of the structural components 10, 30, 50 at the appropriate times. Consequently, the reflective or transparent material for the first outer layers 16, 32, 52 may be dispensed to build up the first outer layers 16, 32, 52. At the appropriate time, the material for the patterned layers 20, 36, 56 may be dispensed in a manner to build the patterned layers 20, 36, 56 and define the geometric patterns 12, 38, 60. For the structural components 30, 50, the material for the first outer layers 32, 52 or the second outer layers 34, 54 may be dispensed to fill in the spaces between the wires 40, 42, 58. Finally, the material for the second outer layers 18, 34, 54 is added to complete construction of the structural components 30, 50. While the first outer layers 32, 52 and the second outer layers 34, 54 are illustrated as being distinct layers, those skilled in the art will understand that additive manufacturing techniques may allow the structural components 30, 50 to be fabricated as a unitary structure of a homogenous material without discernible layers with the exception of the pattern layers 36, 56 formed by the wires 40, 42, 58 being embedded therein. Additional fabrication methods for the structural components 10, 30, 50 in accordance with the present disclosure are contemplated by the inventors.

In some embodiments, the wires 58 may be implemented via induction susceptors that assist in the fabrication of the structural component 50 and then function to form the geometric pattern 60 of grooves. The induction susceptors may be placed along a bond line to perform a dual purpose of creating the bond between outer layers 52, 54 and then providing the means for monitoring the stresses and strains at the bond line. In one embodiment, the susceptors may be approximately 0.008" to 0.010" in diameter and have a spacing between wire centers of approximately two times the wire diameter. The induction susceptor wires may initially be embedded in neat resin to form a screen that is placed in the bond line. The wires may then be used to rapidly heat via induction and weld thermoplastic structures together. Once the bond and the structural component are created, the internal wires can be inspected initially via the inspection processes in accordance with the present disclosure to determine their initial baseline diffraction response to EM energy. Changes to the stresses and strains at the bond line can then be checked periodically as the structural component 50 is subjected to normal environmental conditions, or after experiencing unplanned loading conditions.

Figure 5:
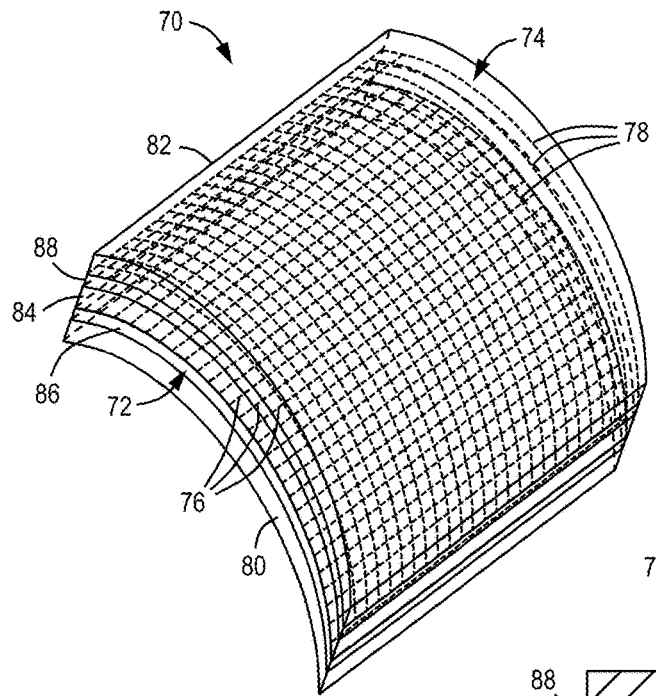
FIG. 5 is an isometric view of a structural component of a mechanical system having multiple layers and multiple geometric patterns of grooves in accordance with the present disclosure.
Figure 6:
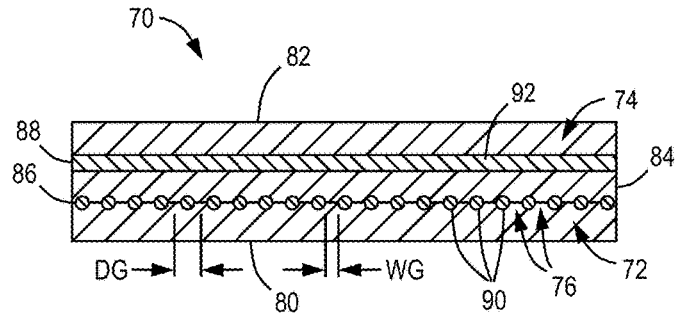
FIG. 6 is a partial cross-sectional view of the structural component of FIG. 5 having an exemplary configuration of multiple geometric patterns of grooves.

FIGS. 5 and 6 illustrate an alternative embodiment of a structural component 70 having multiple geometric patterns 72, 74 of grooves 76, 78 at varying depths to provide strain indications at different locations within the structural component 70. The structural component 70 may include a first outer layer 80, a second outer layer 82 and an intermediate layer 84 disposed there between. A first patterned layer 86 with the first geometric pattern 72 similar to the patterned layers discussed above is disposed between the first outer layer 80 and the intermediate layer 84, and a second patterned layer 88 with the second geometric pattern 74 is disposed between the intermediate layer 84 and the second outer layer 82. As illustrated, the first geometric pattern 72 is formed by a plurality of wires or rods 90 aligned in a first direction, and the second geometric pattern 74 is formed by a plurality of wires or rods 92 oriented in a second direction.

With the overlapping arrangement, the materials from the layers 80, 82, 88 and the groove widths WG and the groove spacing distances DG will be selected so that the EM energy that would be diffracted by the first geometric pattern 72 of grooves 76 will pass through the layers 80, 82, 84 and the second geometric pattern 74 of grooves 78 without diffraction so that meaningful strain measurements can be obtained. Generally, low frequency EM energy with longer wavelengths may penetrate deeper into the structural component 70 than higher frequency EM energy with shorter wavelengths. Consequently, in an illustrative example, the first geometric pattern 72 of grooves 76 may be configured to diffract EM energy in the terahertz, microwave or ultrasonic bands, and the second geometric pattern 74 of grooves 78, being nearer to the surface of the second outer layer 82, may be configured to diffract higher frequency EM energy in the ultraviolet or infrared bands. With this configuration, the wavelengths of the EM energy in the terahertz, microwave and ultrasonic bands will be greater than two times the groove widths WG of the grooves 78 of the second geometric pattern 74 such that the EM energy can pass the grooves 78 on the way to the first geometric pattern 72 without diffraction. Penetration through the structural component 70 for either type of EM energy can be enhanced by increasing the intensity of the EM energy projected onto the structural component 70. In alternative embodiments, the geometric patterns 72, 74 may be located in non-overlapping areas of the structural component 70 so that the EM energy for one geometric pattern 72, 74 does not encounter the other geometric pattern 72, 74 as the EM energy passes through the structural component 70.

Figure 7G:
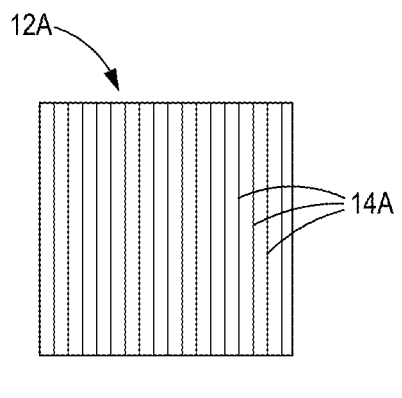
Figure 7G:
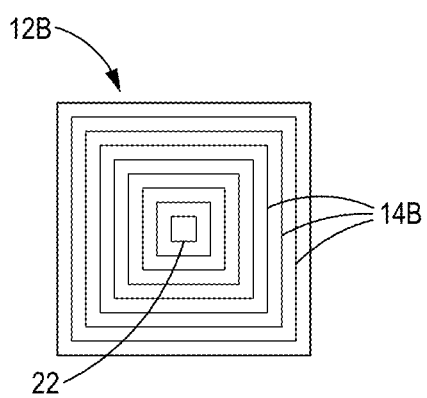
Figure 7G:
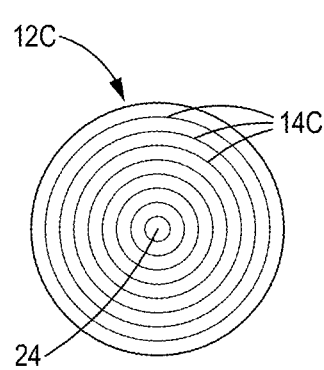
Figure 7G:
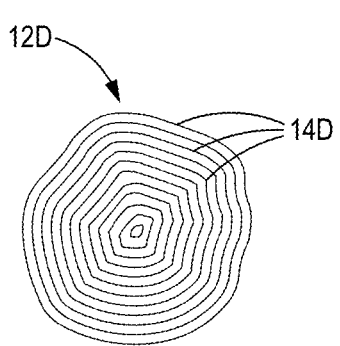
Figure 7G:
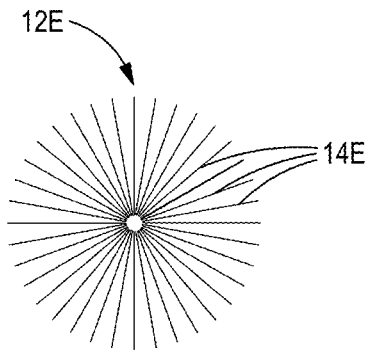
Figure 7G:
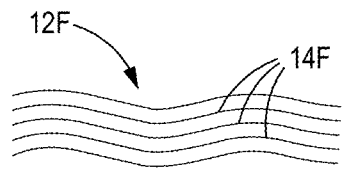
Figure 7G:
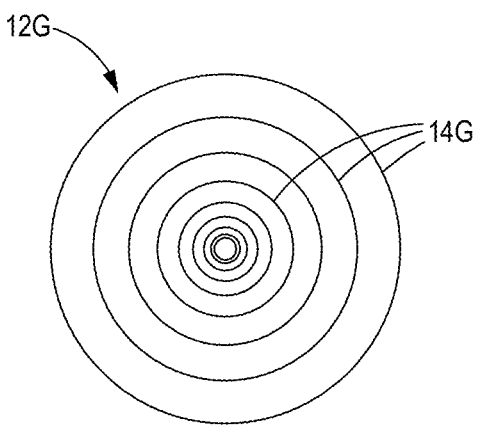

An appropriate geometric pattern for a structural component may be dictated by the characteristics of the structural component, the environmental conditions anticipated to be encountered by the structural component, development testing results, experience with the structural component in the field and other factors. FIGS. 7A-7G provide several examples of geometric patterns 12A-12G that may be created within a structural component as appropriate. FIG. 7A illustrates an exemplary one-dimensional geometric pattern 12A formed by a series of parallel linear grooves 14A. The linear geometric pattern 12A may be appropriate for a cylindrical structural component such as a pipe (not shown) that may be subjected to circumferential or hoop stresses, but minimal stresses in an axial direction. The geometric pattern 12A may wrap around the cylindrical structural component with the grooves 14A aligned parallel to a longitudinal axis of the structural components such that strain due to hoop stresses will increase the circumferential groove width WG between the grooves 14A.

FIG. 7B illustrates an example of a two-dimensional geometric pattern 12B formed by a plurality of square or rectangular grooves 14B. The square or rectangular grooves 14B define increasing areas, and are arranged concentrically to form the geometric pattern 12B. The rectangular geometric pattern 12B may have use, for example, in a structural component 10 having a rectangular opening 22 passing there through. FIG. 7C illustrates an alternative two-dimensional geometric pattern 12C formed by a plurality of concentric circular grooves 14C defining increasing areas. The circular geometric pattern 12C may have application in a structural component 10 where stress on the structural component 10 may be directed radially outward from a point at the center of the geometric pattern 12C. FIG. 7D illustrates a further example of a geometric pattern 12D having concentric grooves 14D with a more complex geometric shape that may correspond to a shape of an opening or other component extending from the structural component 10. Additional irregular shapes are contemplated based on the needs of a particular implementation in the structural component 10.

FIG. 7E illustrates a further alternative two-dimensional geometric pattern 12E having a plurality of grooves 14E extending radially outward from a central point 24. The geometric pattern 12E may be an alternative to the geometric pattern 12C where circumferential stresses are more prevalent than radial stresses. FIG. 7F illustrates a geometric pattern 12F formed by a plurality of parallel curved grooves 14F. The curved grooves 14F may follow a contour of a component having a curved shape extending through the structural component 10 such as an aircraft wing.

In some implementations, the structural component 10 may have areas of interest where it may be desirable to have greater sensitivity to strain and changes in the groove width WG. In such situations, areas of interest may be distinguished by varying the spacing between the grooves 14, the groove width WG and the wavelength across the structural component 10. FIG. 7G illustrates a geometric pattern 12G that is a modification of the circular geometric pattern 12C of FIG. 7C wherein the groove spacing distance DG between adjacent grooves 14G increases as the geometric pattern 12G extends outward from the center where it may be more critical to closely inspect the radial stresses. The area with the smaller groove spacing distance DG and correspondingly higher concentration of grooves 14G may be more sensitive to strain and changes in the groove width WG and produce a more intense response in the diffracted wavelength of the reflected or transmitted EM energy to the projected EM energy in the area of interest than at the area with greater groove spacing distance DG and spaced out remote grooves 14G.

As another alternative that may provide a smarter strain indicator, the geometric pattern 12 may have sets of grooves 14 laid down at angles relative to each other with different groove widths WG to independently monitor different levels or types of strain occurring in the structural component. For example, the geometric patterns 12C, 12E may be combined into a single geometric pattern 12 on the structural component. The circular geometric pattern 12C may be created with the groove width WG being within the range responsive to ultraviolet EM energy and the geometric pattern 12E created overlying the geometric pattern 12C with the groove width WG being within the range responsive to mid infrared EM energy. During inspection, the radial strains can be interrogated by projecting ultraviolet EM energy at the structural component, and the circumferential strains can be interrogated by projecting mid infrared EM energy at the structural component. Alternative or additional geometric patterns 12 such as those illustrated and described herein can further be created within the structural component with varying groove widths WG and corresponding wavelengths of EM energy to inspect for additional strain patterns as necessary in a particular implementation.

Figure 8:
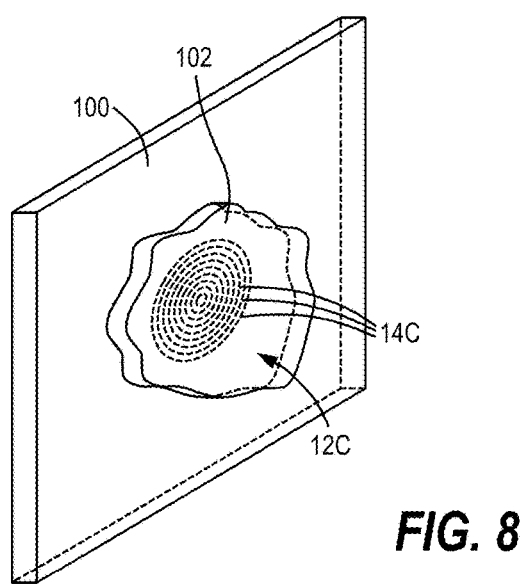
FIG. 8 is an isometric view of a portion of a structural component with a patch installed thereon having a geometric pattern of grooves in accordance with the present disclosure.

FIG. 8 illustrates an implementation where the structural component 100 has a patch 102 applied over a damaged area. The patch 102 is appropriately shaped to cover the damaged area, and is affixed to the structural component 100 via rivets, welds, adhesive, lamination or other appropriate attachment means. The patch 102 includes, for example, the geometric pattern 12C of FIG. 7C at or close to the bond line between the structural component 100 and the patch 102. After the patch 102 is installed, it may be inspected according to the systems and methods disclosed herein. In addition to detecting strains in the patch 102, the inspection may provide evaluation of the integrity of the application of the patch 102 to the structural component 100. If the patch 102 is properly applied and attached to the structural component 100, stresses in the structural component 100 will be transmitted to the patch 102 and corresponding strain will appear during the inspection. If the patch 102 is not properly applied and conditions such as delamination are present, the stresses may not be transferred and the inspection of the patch 102 will reveal less strain in the patch 102 than expected. Such results may prompt further investigation and reapplication of the patch 102 over the damaged area.

Figure 9:
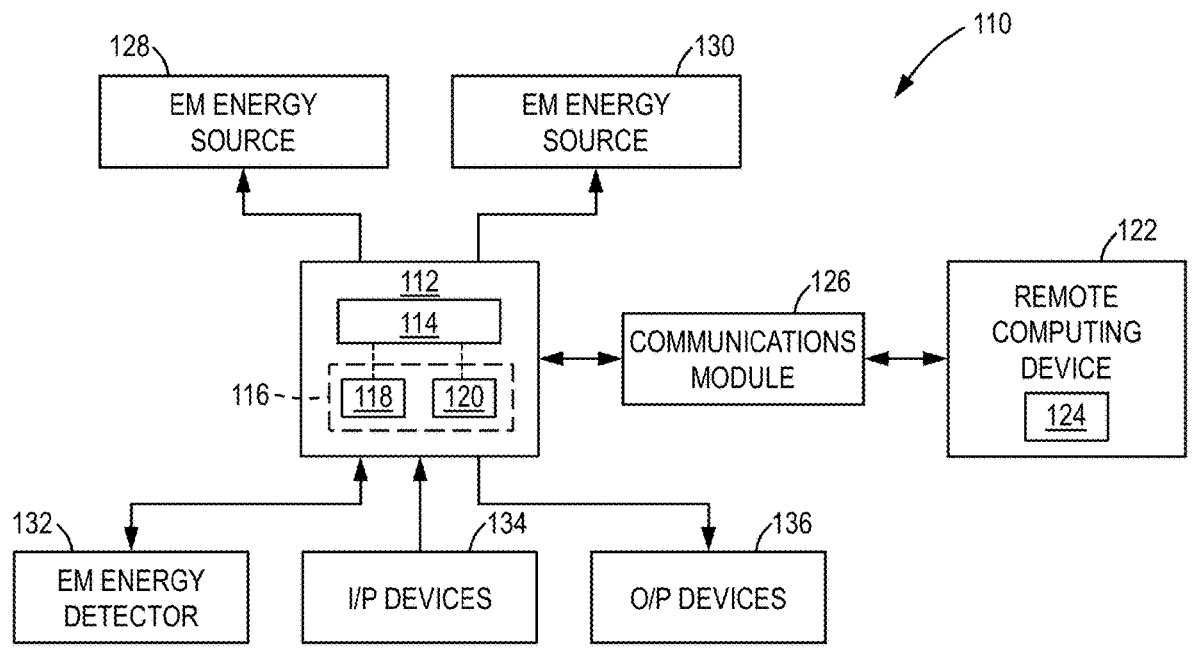
FIG. 9 is a block diagram of electrical and control components that may implement structural component inspection in accordance with the present disclosure.

The geometric patterns 12 illustrated and described herein may be incorporated into an inspection system 110 for assessing strain in the structural component 10. FIG. 9 illustrates an exemplary arrangement of electrical and control components that may be integrated in the inspection system 110 in accordance with the present disclosure that may determine strain in the structural component 10, for example. A controller 112 may be capable of processing information received from monitoring and control devices using software stored at the controller 112, and outputting command and control signals to devices of the inspection system 110. The controller 112 may include a processor 114 for executing a specified program, which controls and monitors various functions associated with the inspection system 110. The processor 114 may be operatively connected to a memory 116 that may have a read only memory (ROM) 118 for storing programs, and a random access memory (RAM) 120 serving as a working memory area for use in executing a program stored in the ROM 118. Although the processor 114 is shown, it is also possible and contemplated to use other electronic components such as a microcontroller, an application specific integrated circuit (ASIC) chip, or any other integrated circuit device.

While the discussion provided herein relates to the functionality of the inspection system 110, the controller 112 may be configured to control other aspects of operation of other systems. Moreover, the controller 112 may refer collectively to multiple control and processing devices across which the functionality of the inspection system 110 and other systems may be distributed. For example, portions of the functionality of the inspection system 110 may be performed at a remote computing device 122 having a controller 124 that is operatively connected to the controller 112 by a communications module 126 of the inspection system 110. The remote computing device 122 may be located in the centralized location for an enterprise utilizing the inspection system 110 to perform inspections on mechanical systems. The controllers 112, 124 may be operatively connected to exchange information as necessary to control the operation of the inspection system 110. Other variations in consolidating and distributing the processing of the controllers 112, 124 as described herein are contemplated as having use in inspection systems 110 in accordance with the present disclosure.

The inspection system 110 may further include one or more EM energy sources 128, 130 capable of projecting EM energy at predetermined wavelengths corresponding to the groove width WG of the grooves 14 in the geometric pattern 12 for example. The EM energy sources 128, 130 may receive control signals from the processor 114 causing the EM energy sources 128, 130 to project EM energy at predetermined wavelengths. In some embodiments, each EM energy source 128, 130 may be capable of projecting EM energy at one wavelength. In alternative embodiments, each EM energy source 128, 130 or a single EM energy source may be capable of projecting EM energy at different wavelengths. While the EM energy sources 128, 130 are illustrated and described as being operatively connected to the processor 114, those skilled in the art will understand that the EM energy sources 128, 130 may be standalone devices having associated input devices such as on/off switches, wavelength selection inputs and the like for manual control of the operation by personnel performing an inspection.

The inspection system 110 also may include an EM energy detector 132 operatively connected to the processor 114. The EM energy detector 132 may be any device capable of detecting the diffracted wavelength of the EM energy reflected or transmitted from the geometric pattern 12 when EM energy from the EM energy sources 128, 130 is projected onto the geometric pattern 12. In the embodiments illustrated herein, the EM energy detector 132 may be an optical detector capable of detecting the diffracted wavelength of the reflected or transmitted EM energy. For example, the EM energy detector 132 may be a charge-coupled device (CCD) camera, a video camera, photographic film or other EM energy-sensing apparatus. When activated by the processor 114 or manually actuated by appropriate input devices, the EM energy detector 132 can capture the diffracted EM energy and transmit a representation of the detected diffracted wavelengths of the diffracted EM energy to the processor 114. Once received, the processor 114 may store the diffracted wavelengths in the memory 116. Those skilled in the art will understand that detection of the wavelengths or frequencies of the diffracted EM energy and determinations of variations in the diffracted wavelengths or frequencies may be achieved using alternative mechanisms as desired or necessitated by a particular implementation of the systems and methods described herein, and the use such alternative mechanisms is contemplated by the inventors. It should be understood that use of any other mechanisms for detection and analysis of the diffracted wavelengths of the diffracted EM energy has equal application in the systems and methods of the present disclosure.

The inspection system 110 may have one or more input devices 134 adjustable by an operator to control the inspection process. The input device 134 can include switches, buttons, keyboards, mice, touchscreens and the like capable of receiving input commands from an operator. Output devices 136, such as monitors, screens, touchscreens, speakers, printers and the like may convey information from the inspection system 110 to the operator.

Figure 10:
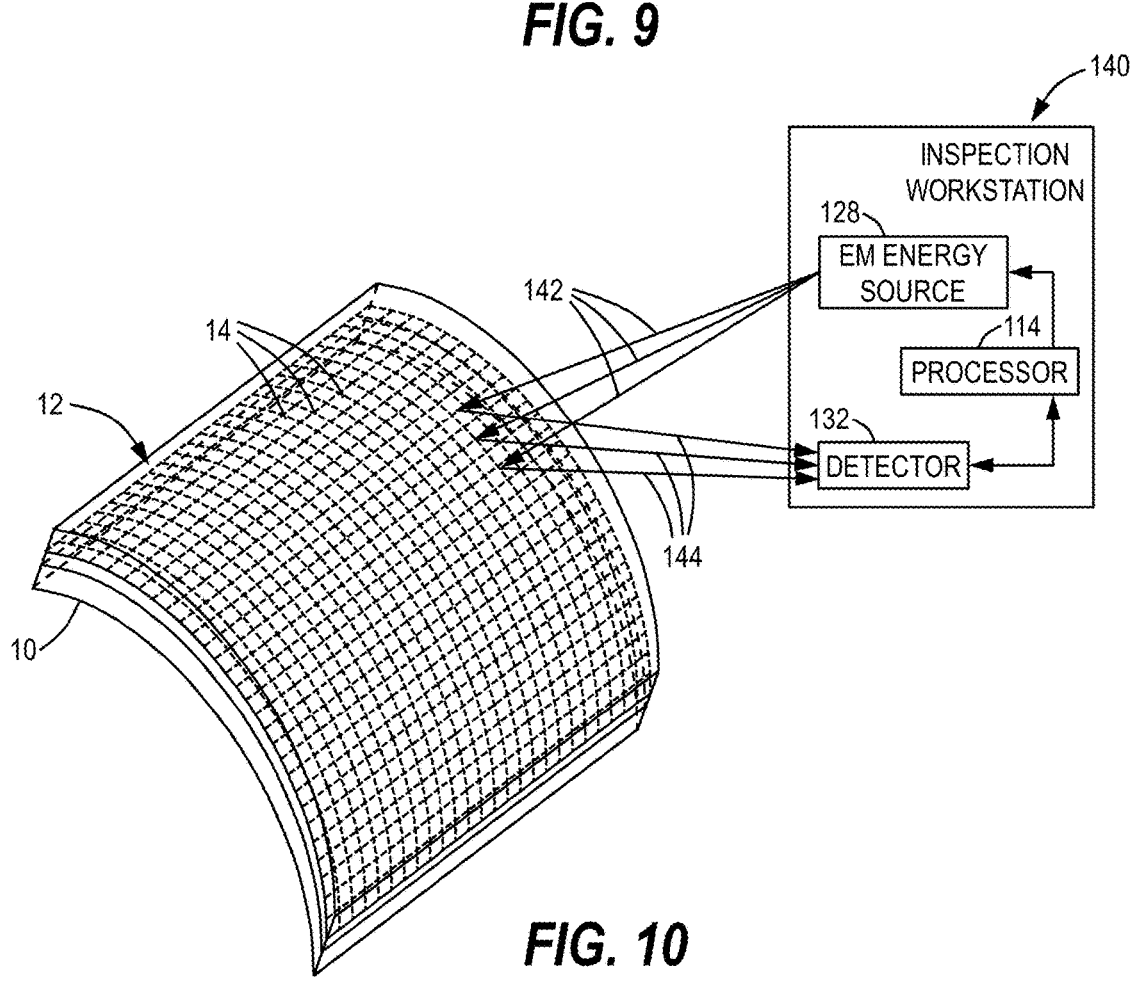
FIG. 10 is a schematic illustration of an exemplary implementation of an inspection system and inspection method in accordance with the present disclosure on the structural component of FIG. 1.

An exemplary implementation of the inspection system 110 is illustrated in FIG. 10. The processor 114, the EM energy source 128 and the EM energy detector 132 are integrated in an inspection workstation 140. The inspection workstation 140 may be, for example, a workstation at a maintenance facility for the mechanical system of which the structural component 10 is a part. With the structural component 10 disposed at the inspection workstation 140, the EM energy source 128 may be activated to project beams 142 of EM energy at the appropriate wavelength onto the geometric pattern 12. The projected beams 142 are diffracted and reflected by the geometric pattern 12 to produce beams 144 of diffracted EM energy. The EM energy detector 132 receives and detects the beams 144 of diffracted EM energy, and transmits the detected EM energy to the processor 114 for analysis and correlation of the detected diffracted wavelengths or frequencies of the reflected beams 144 of EM energy into corresponding strain values. The processor 114 may be programmed with algorithms known in the art for performing the conversion of the detected wavelengths or frequencies into strain values.

Figure 11:
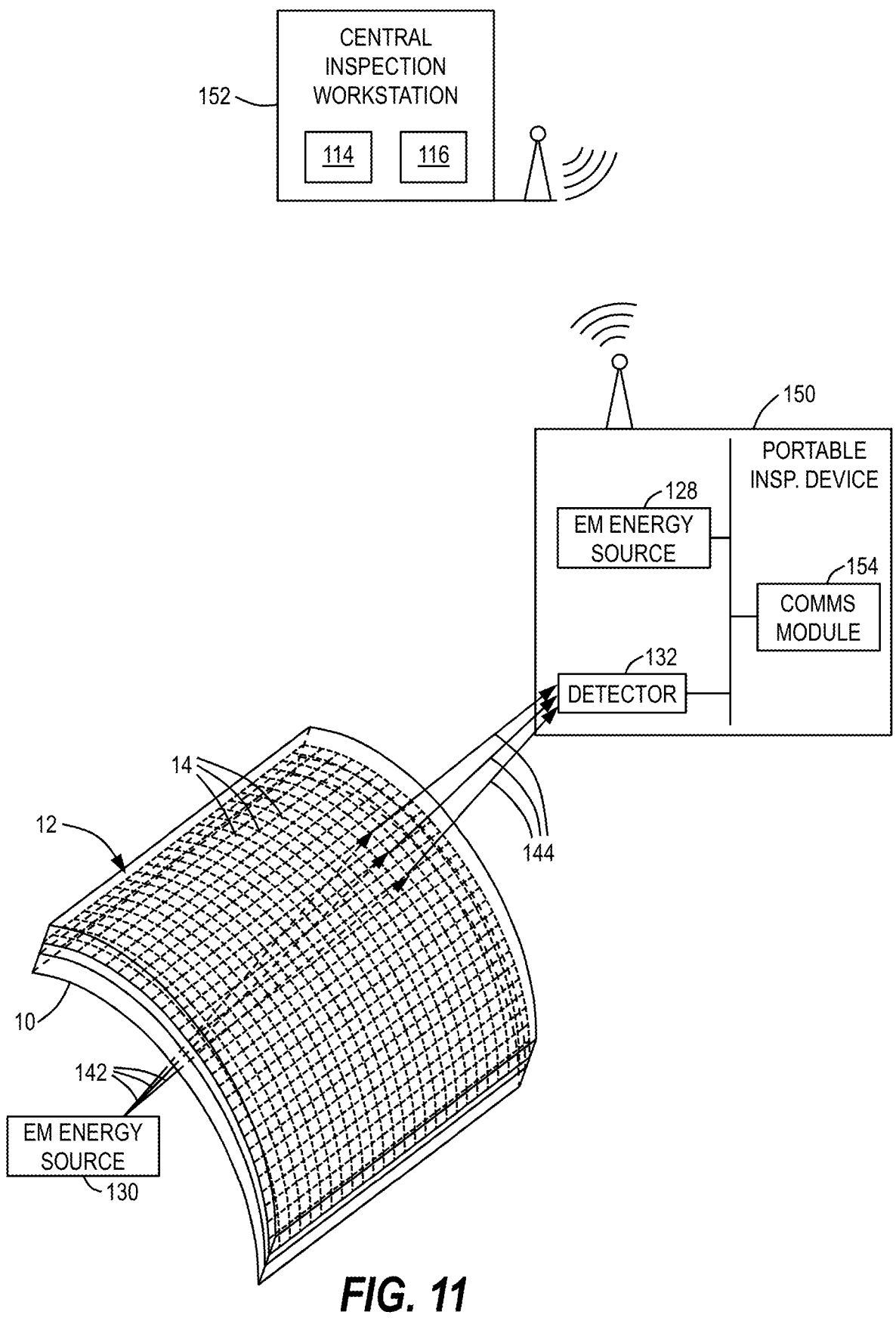
FIG. 11 is a schematic illustration of an alternative exemplary implementation of the inspection system and inspection method on the structural component of FIG. 1.

FIG. 11 illustrates an alternative implementation of the inspection system 110 where the EM energy source 128 and the EM energy detector 132 are components of a portable inspection device 150, and the processor 114 and the memory 116 are located at a central inspection workstation 152. The portable inspection device 150 may be a laptop computer, a tablet, a smart phone, a personal digital assistant or other portable processing device. The portable inspection device 150 may further include a communications module 154 capable of wireless communications with the communications module 126 at the central inspection workstation to transmit the detected colors from the EM energy detector 132. The EM energy may be projected from the EM energy source 128 and detected by the EM energy detector 132 in a similar manner as illustrated and described for FIG. 10.

FIG. 11 further illustrates an implementation where the EM energy source 130 is positioned on the opposite side of the structural component 10 from the portable inspection device 150. The EM energy source 130 may be permanently mounted within a hard-to-reach location within the mechanical system. As shown, the EM energy source 130 may project beams 142 of EM energy onto the structural component 10 and the geometric pattern 12. The EM energy is diffracted by the grooves 14 at the geometric pattern 12 and transmitted through the structural component 10 in beams 144. The beams 144 of diffracted EM energy are received at the EM energy detector 132 on the opposite side of the structural component 10 and processed by the processor 114.

Figure 12:
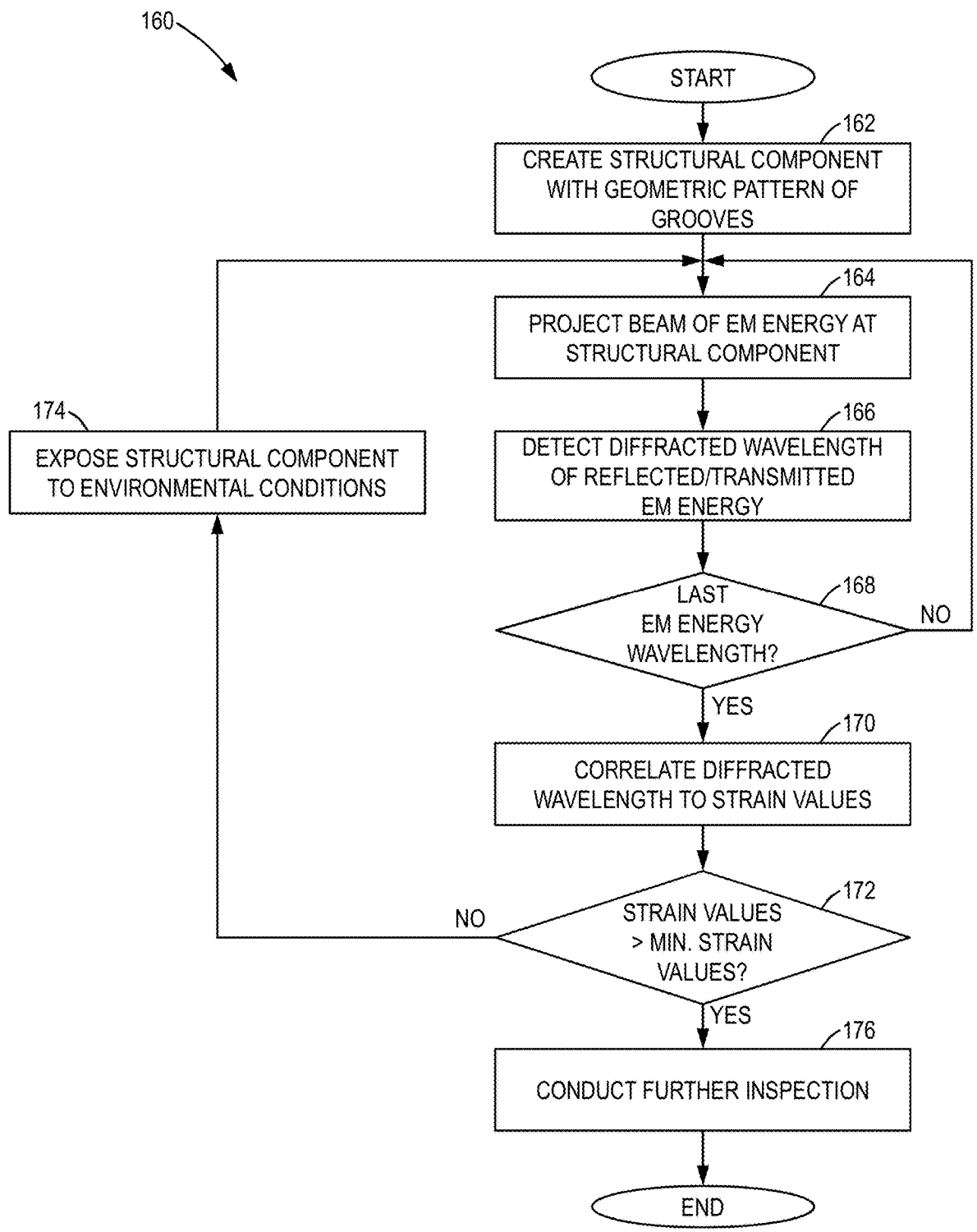
FIG. 12 is a flow diagram of an embodiment of an inspection routine in accordance with the present disclosure.

FIG. 12 illustrates an exemplary inspection routine 160 that may be performed on the structural components 10, 30, 50, 70, 100 by the inspection system 110. The routine 160 may begin at a block 162 where the structural component is created (e.g. fabricated) with one or more of the geometric patterns 12, 12A-12G of grooves 14, 14A-14G created within the structural component. The grooves 14, 14A-14G may be formed in the structural component using any appropriate manufacturing technique. After the structural component is created with the geometric pattern 12, 12A-12G, control may pass to a block 164 where the EM energy source 128 projects the beam 142 of EM energy with the corresponding wavelength at the structural component and onto the geometric pattern 12, 12A-12G. The EM energy in the projected beams 142 is diffracted by the grooves 14, 14A-14G, and corresponding EM energy with diffracted wavelengths is reflected or transmitted from the geometric pattern 12, 12A-12G. The reflected or transmitted beams 144 of EM energy may have diffracted wavelengths that vary at different locations on the geometric pattern 12, 12A-12G due to changes in the groove width WG caused by strain on the structural component.

With the beams 142 of EM energy projected onto the geometric pattern 12, 12A-12G and being diffracted and reflected or transmitted, control may pass to a block 166 where the beams 144 of diffracted EM energy are detected by the EM energy detector 132 to detect the diffracted wavelengths. The diffracted wavelengths of the beams 144 of EM energy may be temporarily stored or permanently stored in the memory 116.

After the diffracted beams 144 of EM energy are detected, control may pass to a block 168 where the inspection system 110 may determine whether EM energy with a last EM energy wavelength has been projected onto the geometric pattern 12, 12A-12G. As discussed above, some implementations may have a first set of grooves 14, 14A-14G with a first groove width WG onto which a first beam 142 of EM energy having a first wavelength is projected, and a second set of grooves 14, 14A-14G with a second groove width WG onto which a second beam 142 of EM energy having a second wavelength is projected. In these implementations, it may be necessary to project only beams 142 with one wavelength at a time. Consequently, if it is determined at the block 168 that beams 142 of EM energy having the various wavelengths have not been projected onto the geometric pattern 12, 12A-12G, control may pass back to the blocks 164, 166 to project EM energy from the EM energy source 128, 130 with a different one of the wavelengths onto the geometric pattern 12, 12A-12G and detect the corresponding diffracted wavelengths in the beams 144 of EM energy for the next projected beam 142 as described above.

If beams 142 of EM energy with all the necessary wavelengths have been projected and the diffracted beams 144 of EM energy have been detected at the block 168, control may pass to a block 170 where the diffracted wavelengths of the beams 144 are correlated to strains in the structural component. As discussed above, the processor 114 may be programmed with algorithms known in the art for correlating the wavelengths of the EM energy in the diffracted beams 144 into strain values.

After the strain values are determined for the diffracted beams 144 of EM energy at the block 170, control may pass to a block 172 to determine whether any of the strain values calculated from the diffracted wavelengths in the diffracted beams 144 of EM energy exceeds a predetermined minimum strain value above which further inspection or maintenance should be performed. As discussed, certain levels of strain are acceptable in a structural component. As an alternative, the current strain value may be compared to baseline strain values obtained for the structural component before the mechanical system is placed in service and exposed to environmental conditions. The baseline strain values in the geometric pattern 12, 12A-12G can be established by projecting the beams 142 on the structural component when no strain is placed on the structural component, or when a known strain is placed on the structural component to determine the diffracted wavelengths in the beams 144 in response. In other embodiments, a portion of the geometric pattern 12, 12A-12G may be applied in an area that will not experience strains during exposure to the environmental conditions, and the diffracted wavelengths from the non-strained area may establish real-time dynamic baselines at the time the inspection is performed.

A comparison may be made between the current strain values and the baseline or other previously determined strain values to determine whether the current strain values differ from the previous strain values by more than a minimum amount or percentage. If the strain values are not greater than the minimum strain value and further inspection is not otherwise required, control may pass to a block 174 where the structural component is exposed to environmental conditions. The exposure may come from normal use in the normal environment of the mechanical system. Where the mechanical system is in a development stage, the environmental conditions may be applied in a test environment. After the exposure at the block 174, control may pass back to the block 164 to initiate another instance of inspecting the structural component. Strain values being greater than the minimum strain value at the block 172 can indicate that further inspection, maintenance or replacement of the structural component may be necessary. If strain values are greater than the minimum strain value at the block 172, control passes to a block 176 to conduct further inspection of the structural component.

Figure 13:
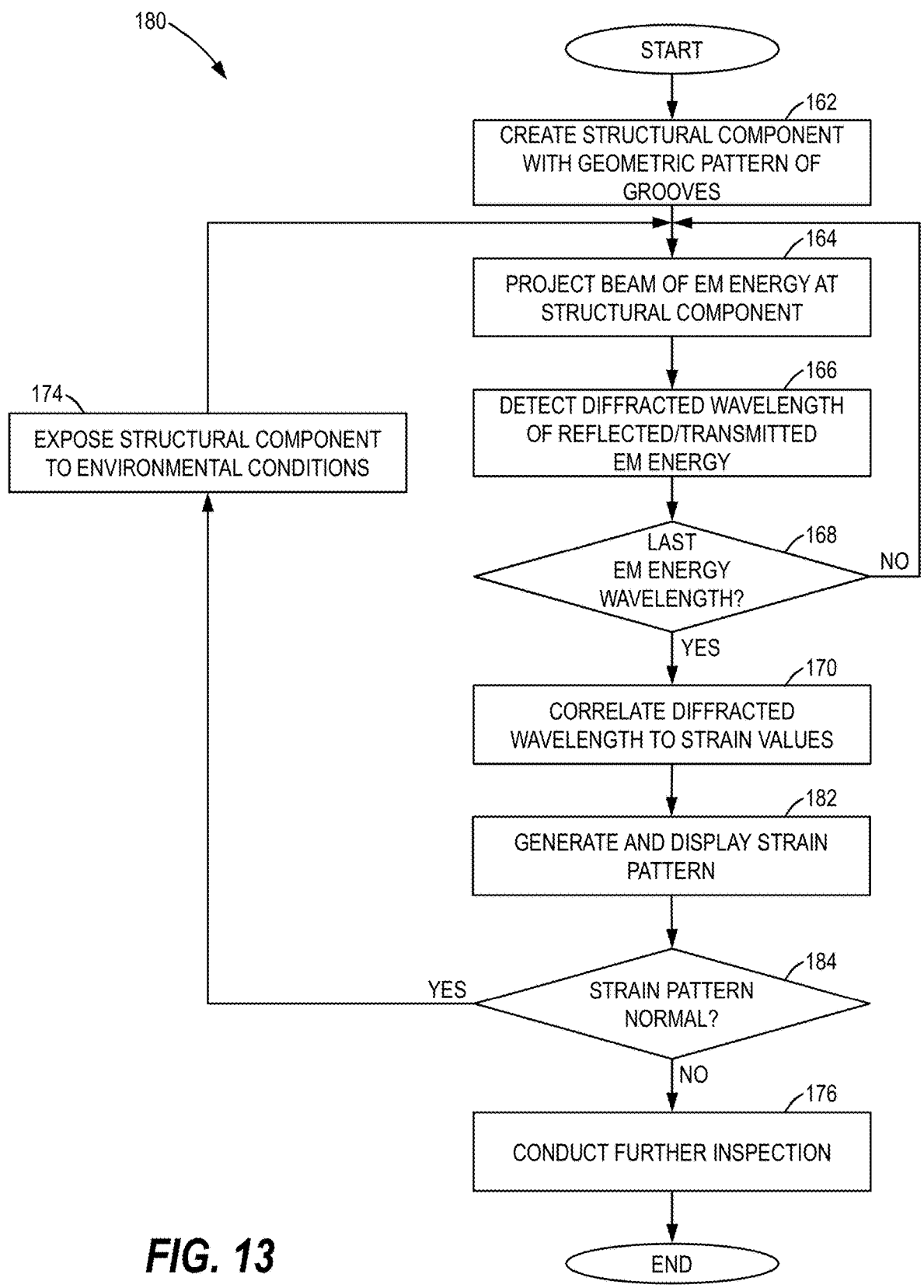
FIG. 13 is a flow diagram of an alternative embodiment of an inspection routine in accordance with the present disclosure.

The inspection routine 160 of FIG. 12 is an example of a quantitative process for evaluating the strain in the structural components 10, 30, 50, 70, 100 and identifying when further inspection, maintenance or replacement may be required. In some implementation, it may be appropriate to substitute for or supplement the quantitative inspection routine 160 with a qualitative process wherein the experience of inspectors performing the inspection may be used to analyze a strain pattern in the structural components 10, 30, 50, 70, 100 and identify abnormalities in the strain pattern that may require further inspection. FIG. 13 illustrates an exemplary qualitative inspection routine 180 that may be performed on the structural components 10, 30, 50, 70, 100 by the inspection system 110 and an inspector, engineer or other inspection technician utilizing the inspection system 110. The inspection routine 180 may begin in a similar manner as the inspection routine 160 wherein the structural component 10, 30, 50, 70, 100 is created with the geometric pattern 12, 12A-12G of grooves 14, 14A-14G at the block 162, beams 142 of EM energy are projected onto the structural component 10, 30, 50, 70, 100 at the block 164, beams 144 of diffracted EM energy are detected at the block 166, and the diffracted wavelengths from the beams 144 of diffracted EM energy are correlated to strains in the structural component 10, 30, 50, 70, 100 at the block 170.

To implement the inspection routine 180, the inspection system 100 may be modified at blocks 164, 166, 170 to identify locations of the beams 142, 144 relative to the inspected structural component 10, 30, 50, 70, 100 as the beams 142 are projected over the surface of the structural component 10, 30, 50, 70, 100. Known techniques for determining locations and movements of a body or device such as the structural component 10 as it moves relative to the inspection workstation 140 of FIG. 10 or the portable inspection device 150 of FIG. 11 as it moves past the surface of the structural component 10, for example. The location information for the beams 144 of diffracted EM energy may be stored at the memory 116 along with the diffracted wavelengths detected at the block 166 and the correlated strain values determined at the block 170.

Figure 14:
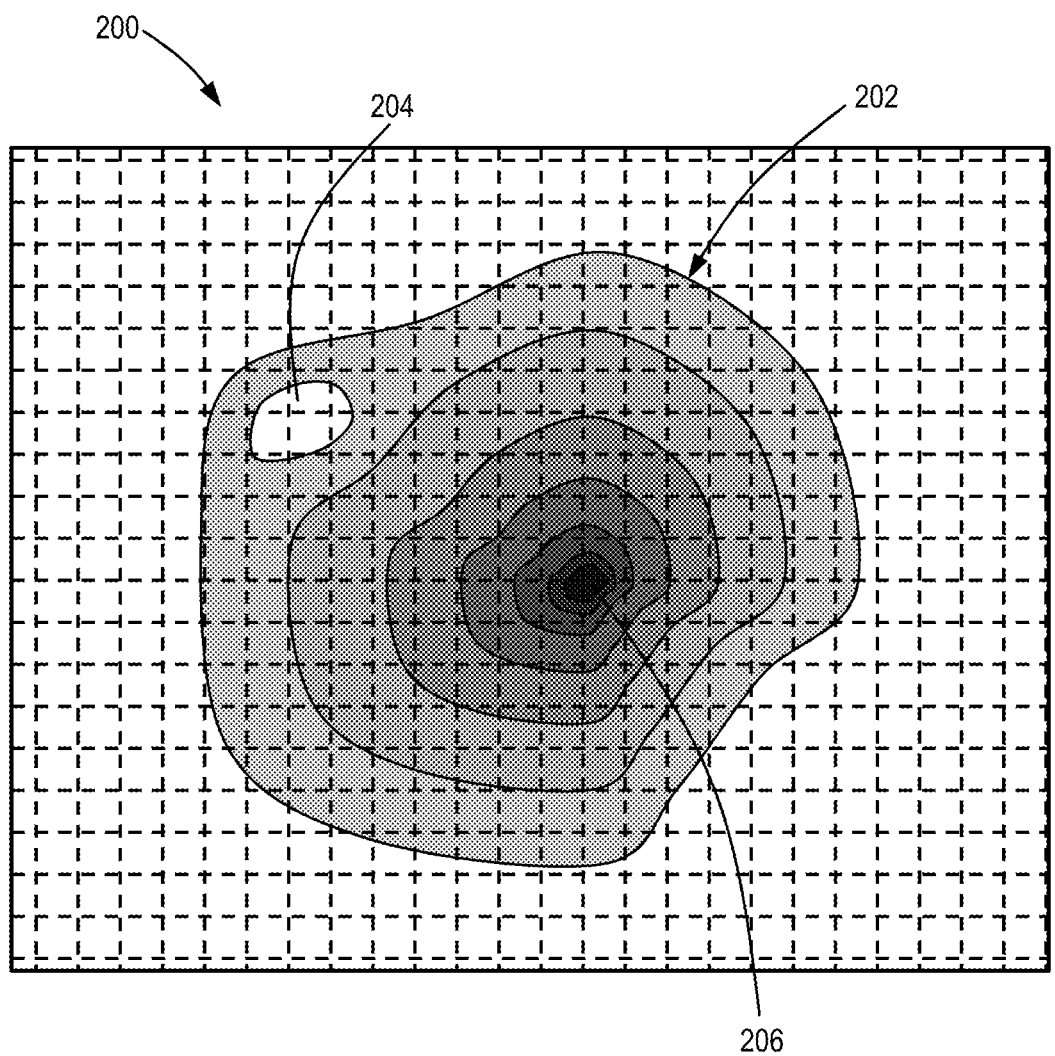
FIG. 14 is a diagram of an exemplary strain pattern display in accordance with the present disclosure.

After the diffracted wavelengths are detected and the strain values are determined, or dynamically as the inspection system 110 is inspecting the structural component 10, 30, 50, 70, 100, control may pass to a block 182 where the diffracted wavelengths, the strain values and the locations of the beams 144 relative to the structural component 10, 30, 50, 70, 100 may be used to generate and display a strain pattern for the inspected structural component 10, 30, 50, 70, 100. FIG. 14 illustrates an example of a display 200 of a strain pattern 202 that may be derived from the information acquired by the inspection system 110. The display 200 may be any appropriate visual display that conveys a graphical representation of the strains in the structural component 10, 30, 50, 70, 100. For example, the display 200 may be a video display at one of the output devices 136 at the inspection workstation 140, the portable inspection device 150, the central inspection workstation 152 or other location where an inspector may view the display 200. In alternative embodiments, the display 200 may be a printout output by one of the output devices 136 at an appropriate location. Further, alternative visual display output devices 136 for displaying the strain pattern 202 will be apparent to those skilled in the art and are contemplated by the inventors.

The strain pattern 202 is a visual representation of the distribution of strain values across the inspected structural component 10, 30, 50, 70, 100. In the illustrated example, the display of the strain pattern 202 utilizes grayscale shading to depict the locations and magnitudes of the strain values in the structural component 10, 30, 50, 70, 100. White or lighter gray shades may indicate low strain areas, and the gray shading may darken as the strain values increase. The spacing between the shaded areas provides an indication of the rate of change of the strain values across the structural component 10, 30, 50, 70, 100. In alternative embodiments, the strain pattern may be color coded. For example, blue may corresponding to low strain values and the colors may progress through the color spectrum to red which may represent high strain values. In other embodiments, the strain pattern may be presented as lines of constant strain values having appearances similar to weather maps showing barometric pressure changes or topographical maps showing elevation changes. Further alternative depiction strategies are contemplated.

In some embodiments where grayscale or the color spectrum are used, a scale may be added to the display 200 to indicate the strain values corresponding to the various shades or colors in the strain pattern 202. The display 200 may further display a minimum strain value at minimum strain area 204, and a maximum strain value at a maximum strain area 206. The display 200 may further be enhanced by displaying the strain pattern 202 overlaying a captured image or graphical representation of the structural component 10, 30, 50, 70, 100 and positioned on the image to more clearly illustrate the location of the strain pattern on the structural component 10, 30, 50, 70, 100.

With the strain pattern 202 generated and displayed on the display 200 at the block 182, control may pass to a block 184 where an inspector, maintenance person or other technician may review the strain pattern 202 to determine whether the strain pattern 202 is normal for the environmental conditions to which the structural component 10, 30, 50, 70, 100 has been subjected. The inspector may reference their experience in inspecting the current and/or other structural components in evaluating whether the strain pattern 202 has the characteristics that should be expected, or whether the strain pattern 202 indicates that issues may exist requiring additional inspection. The evaluation may include reviewing baseline information collected for the structural component 10, 30, 50, 70, 100 of the type discussed above. The baseline information may be presented in any appropriate format. In some implementations, the baseline information may be used to generate a baseline strain pattern that may be displayed at the display 200 as a supplement to the real time strain pattern 202 to provide a visual comparison.

If the inspector determines at the block 184 that the strain pattern 202 is normal, the strain values illustrated in the strain pattern 202 are not greater than or less than strain values that would indicate issues exist, and further inspection is not otherwise required, control may pass to the block 174 where the structural component is exposed to environmental conditions as discussed above. After the exposure at the block 174, control may pass back to the block 164 to initiate another instance of inspecting the structural component 10, 30, 50, 70, 100. The strain pattern 202 being different than expected in strain values that are either greater than expected or less than expected at the block 184 can indicate that further inspection, maintenance or replacement of the structural component 10, 30, 50, 70, 100 may be necessary. If the strain pattern 202 is not normal relative to an expected strain pattern for the structural component 10, 30, 50, 70, 100 at the block 184, control passes to the block 176 to conduct further inspection of the structural component 10, 30, 50, 70, 100. As discussed above, the qualitative inspection routine 180 may be implemented as either an alternative or a supplement to the quantitative inspection routine 160 of FIG. 12.

INDUSTRIAL APPLICABILITY

The inspection system 110 and the routine 160 may have broad application in assessing the structural integrity of structural components in mechanical systems. For example, the inspection system 110 and the routine 160 may be used in a repair monitoring application to ensure the quality of the bond of a repair such as the patch 102 of FIG. 8 to the structural component 100, and the response of the patch 102 to stress and strain over time before the structural component 100 is replaced. If the geometric pattern 12C is created on the patch 102 before the patch 102 is applied to the structural component 100 and located proximate the bond line between the structural component 100 and the patch 102, strains due to bonding can be imaged and analyzed according to the routine 160 to detect residual stresses in the patch 102 and the quality of the bond of the patch 102 to the structural component 100. A baseline image of the patch 102 before the structural component 100 with the patch 102 is exposed to environmental conditions may show any initial strain in the patch 102 and the structural component 100, and periodic imaging after the structural component 100 is exposed to the environmental conditions will monitor the quality and integrity of the bond and the patch 102, and indicate degradation in the repair over time. The strain values derived through the inspection system 110 and the routine 160 may be input into a finite element analysis (FEA) model of the patch 102 on the structural component 100 and analyzed to provide performance assessments of the patch 102, prospective inspection schedules, and approaches to NDI and predictive maintenance and repair plans.

The inspection system 110 and the routine 160 may have application in structural testing environments. Manufacturers typically conduct subscale, mid-scale and full-scale structural testing of components and repairs to ensure proper performance in the field. Such testing can involve static and dynamic loading conditions. Several techniques are currently used in this type of structural testing. For example, strain gauges are applied to structural components as point sensors for monitoring stress and strain during the tests, but their effectiveness in detecting locations in which damage to the structural component initiates and propagates is dependent on where the strain gauges are placed on the structural component. Digital Image Correlation (DIC) may be used to provide stream mapping during structural testing, but the process can be expensive, require expertise in operation, and necessitate spraying a speckled pattern on the surface. Consequently, DIC may be used judiciously in structural testing. The inspection system 110 and the routine 160 may be used as an alternative or a supplement to the currently-used testing techniques, and can be used to monitor and measure real-time strain patterns throughout the test loading conditions. The detected strain patterns can be used to correlate analysis models, and to point to or indicate initial failure locations in the structural component being tested. As in the repair monitoring application, direct feed of the strain information into the FEA tools can provide real-time or load-level damage growth information. The damage initiation and growth information can be used to improve the structural models of the structural components and modify the structural designs.

The inspection system 110 and the routine 160 may be used to improve the fabrication process of composite components that are becoming more prevalent in mechanical systems, and in particular in aerospace systems. During manufacturing development and periodic process monitoring and fabrication of composite components, it may be beneficial to determine and track internal strains in the composite component that are created by the fabrication of the component. The internal strains may be tracked through the use of strain indicator plies in a composite component that are configured with geometric patterns 12, 12A-12G. To create the strain indicator plies, the geometric pattern 12, 12A-12G is applied to the resin in selected plies during fabrication as an additional resin layer sprayed onto the ply that is subsequently configured with the geometric pattern 12, 12A-12G, or as an appliqué that forms a peelable ply that may be removed after the composite component is cured. The patterned strain indicator plies will show residual stresses and strains that exist in the composite component due to the curing process. The information from the patterned strain indicator plies can be used to modify the manufacturing process of the composite component to reduce warpage, predict performance and verify that the production process is still within specification.

The inspection system 110 and the routine 160 may also have application in monitoring the structural health of structural components disposed in limited access areas of their mechanical systems. Limited access structures on aircraft and other mechanical systems can be critical to structural integrity and can experience high loading. Structural health testing of such limited access structures may necessitate costly disassembly and reassembly processes. Strain witness surfaces in the form of the geometric patterns 12, 12A-12G of grooves 14, 14A-14G can be created at strategic locations within the limited access structural components during fabrication. Optical or video borescopes or small cameras and extending mechanisms can function as the EM energy source 128 or 130 and the EM energy detector 132 in the inspection system 110 and be used to detect the diffracted wavelengths in the transmitted EM energy from the geometric patterns 12, 12A-12G on the limited access structures and allow analysis of the diffracted wavelength data to detect degradation of the components and monitor slow damage growth until a repair is needed, for example. As discussed above in relation to FIG. 11, the EM energy source 130 or the EM energy detector 132 may be permanently mounted within the hard-to-reach space or deployed during inspection in a manner that does not require complete disassembly of the structural component. The other of the EM energy source 130 and the EM energy detector 132 may be positioned on the opposite side of the structural component to detect the transmitted beams 144 of EM energy. Where access allows, the EM energy inspection can be combined with other NDI methods, such as infrared thermography or terahertz imaging, to provide an improved assessment and disposition of the limited access components. This and the foregoing applications of the inspection system 110 and the routine 160 are exemplary, and additional applications are contemplated by the inventors.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A multi-layer structural component comprising:
   a first outer layer;
   a second outer layer; and
   a first patterned layer disposed between the first outer layer and the second outer layer and having a first geometric pattern of grooves on a first surface of the first patterned layer, the first geometric pattern of grooves having a first set of grooves each having a first groove width, wherein strain on the multi-layer structural component caused by exposure to an environmental condition can cause changes to the first geometric pattern wherein the first groove width increases or decreases for at least a portion of the first set of grooves, wherein a first projected beam of electromagnetic (EM) energy having a first wavelength corresponding to the first groove width is diffracted when the first projected beam of EM energy hits the first set of grooves and creates a first diffracted beam of diffracted EM energy having a first diffracted wavelength, wherein changes in the first groove width due to the strain on the multi-layer structural component cause changes in the first diffracted wavelength that correspond to the strain on the multi-layer structural component, and wherein at least one of the first outer layer and the second outer layer is fabricated from an outer layer material that is transparent with respect to the first projected beam of EM energy and the first diffracted beam of diffracted EM energy.

2. The multi-layer structural component according to claim 1, wherein the first patterned layer is fabricated from a metallic material.

3. The multi-layer structural component according to claim 1, wherein the first outer layer is fabricated from the outer layer material, and wherein the first patterned layer reflects the first projected beam of EM energy passing through the first outer layer to transmit the first diffracted beam of diffracted EM energy through the first outer layer.

4. The multi-layer structural component according to claim 1, wherein the first outer layer and the second outer layer are fabricated from the outer layer material, and wherein, when the first projected beam of EM energy passes through the first outer layer to the first patterned layer, the first diffracted beam of diffracted EM energy passes through the second outer layer and out of the multi-layer structural component.

5. The multi-layer structural component according to claim 1, comprising:

an intermediate layer between the first outer layer and the second outer layer with the first patterned layer disposed between the first outer layer and the intermediate layer; and a second patterned layer disposed between the intermediate layer and the second outer layer and having a second geometric pattern of grooves on a second surface of the second patterned layer, the second geometric pattern of grooves having a second set of grooves each having a second groove width that is different than the first groove width, wherein a second projected beam of EM energy having a second wavelength corresponding to the second groove width is diffracted when the second projected beam of EM energy hits the second set of grooves and creates a second diffracted beam of diffracted EM energy having a second diffracted wavelength indicating changes in the second groove width due to the strain caused when the multi-layer structural component is exposed to the environmental condition, and wherein the outer layer material is transparent with respect to the second projected beam of EM energy and the second diffracted beam of diffracted EM energy.

6. The multi-layer structural component according to claim 5, wherein the second groove width is greater than the first groove width and the second wavelength is greater than the first wavelength so that the second projected beam of EM energy passes through the first geometric pattern of grooves without being diffracted.

7. The multi-layer structural component according to claim 1, wherein the first geometric pattern of grooves comprises a two-dimensional geometric pattern having a second set of grooves each having a second groove width and spaced in a second direction that is not parallel to a first direction in which the first set of grooves is spaced.

8. The multi-layer structural component according to claim 7, wherein the second groove width is not equal to the first groove width, wherein a second projected beam of EM energy having a second wavelength corresponding to the second groove width is diffracted when the second projected beam of EM energy hits the second set of grooves and creates a second diffracted beam of diffracted EM energy having a second diffracted wavelength indicating changes in the second groove width due to the strain caused when the multi-layer structural component is exposed to the environmental condition, and wherein the outer layer material is transparent with respect to the second projected beam of EM energy and the second diffracted beam of diffracted EM energy.

9. The multi-layer structural component according to claim 1, wherein grooves of the first set of grooves have a similar geometric shape and define increasing areas, with the grooves being arranged concentrically to form the first geometric pattern of grooves.

10. The multi-layer structural component according to claim 9, wherein a groove spacing distance between adjacent grooves of the first geometric pattern increases as the first geometric pattern extends outward from a central point.

11. The multi-layer structural component according to claim 1, wherein the first geometric pattern of grooves has a second set of grooves each having a second groove width, wherein a second projected beam of EM energy having a second wavelength corresponding to the second groove width is diffracted when the second projected beam of EM energy hits the second set of grooves and creates a second diffracted beam of diffracted EM energy having a second diffracted wavelength indicating changes in the second groove width due to the strain caused when the multi-layer structural component is exposed to the environmental condition, and wherein the outer layer material is transparent with respect to the second projected beam of EM energy and the second diffracted beam of diffracted EM energy.

12. The multi-layer structural component according to claim 1, wherein the first patterned layer comprises a plurality of parallel wires defining the first geometric pattern of grooves, wherein the first groove width of the grooves is equal to a wire spacing distance between adjacent ones of the plurality of parallel wires.

13. The multi-layer structural component according to claim 1, wherein the first patterned layer comprises a wire mesh scrim defining the first geometric pattern of grooves, wherein the wire mesh scrim comprises:

a first set of parallel wires oriented in a first direction, wherein the first groove width is equal to a first wire spacing distance between adjacent ones of the first set of parallel wires; and a second set of parallel wires oriented in a second direction that is not parallel to the first direction, wherein a second groove width of the grooves is equal to a second wire spacing distance between adjacent ones of the second set of parallel wires.

14. The multi-layer structural component according to claim 13, wherein the first set of parallel wires is woven together with the second set of parallel wires.

15. The multi-layer structural component according to claim 13, wherein the first groove width is not equal to the second groove width.

16. A multi-layer structural component comprising:
a first outer layer;
a second outer layer;
a first patterned layer disposed between the first outer layer and the second outer layer and having a first geometric pattern of grooves on a first surface of the first patterned layer, the first geometric pattern of grooves having a first set of grooves each having a first groove width, wherein a first projected beam of electromagnetic (EM) energy having a first wavelength corresponding to the first groove width is diffracted when the first projected beam of EM energy hits the first set of grooves and creates a first diffracted beam of diffracted EM energy having a first diffracted wavelength indicating changes in the first groove width due to the strain caused when the multi-layer structural component is exposed to an environmental condition, and wherein at least one of the first outer layer and the second outer layer is fabricated from an outer layer material that is transparent with respect to the first projected beam of EM energy and the first diffracted beam of diffracted EM energy;

an intermediate layer between the first outer layer and the second outer layer with the first patterned layer disposed between the first outer layer and the intermediate layer; and a second patterned layer disposed between the intermediate layer and the second outer layer and having a second geometric pattern of grooves on a second surface of the second patterned layer, the second geometric pattern of grooves having a second set of grooves each having a second groove width that is different than the first groove width, wherein a second projected beam of EM energy having a second wavelength corresponding to the second groove width is diffracted when the second projected beam of EM energy hits the second set of grooves and creates a second diffracted beam of diffracted EM energy having a second diffracted wavelength indicating changes in the second groove width due to the strain caused when the multi-layer structural component is exposed to the environmental condition, and wherein the outer layer material is transparent with respect to the second projected beam of EM energy and the second diffracted beam of diffracted EM energy.

17. The multi-layer structural component according to claim 16, wherein the second groove width is greater than the first groove width and the second wavelength is greater than the first wavelength so that the second projected beam of EM energy passes through the first geometric pattern of grooves without being diffracted.

18. A multi-layer structural component comprising:
a first outer layer;
a second outer layer; and
a first patterned layer disposed between the first outer layer and the second outer layer and having a first geometric pattern of grooves on a first surface of the first patterned layer, the first geometric pattern of grooves having a first set of grooves each having a first groove width, wherein a first projected beam of electromagnetic (EM) energy having a first wavelength corresponding to the first groove width is diffracted when the first projected beam of EM energy hits the first set of grooves and creates a first diffracted beam of diffracted EM energy having a first diffracted wavelength indicating changes in the first groove width due to the strain caused when the multi-layer structural component is exposed to an environmental condition, wherein at least one of the first outer layer and the second outer layer is fabricated from an outer layer material that is transparent with respect to the first projected beam of EM energy and the first diffracted beam of diffracted EM energy, wherein the first patterned layer comprises a first plurality of parallel wires defining the first geometric pattern of grooves, and wherein the first groove width of the grooves is equal to a wire spacing distance between adjacent ones of the first plurality of parallel wires.

19. The multi-layer structural component according to claim 18, wherein the first patterned layer comprises a second plurality of parallel wires that combine with the first plurality of parallel wires for form a wire mesh scrim defining the first geometric pattern of grooves, wherein the first plurality of parallel wires is oriented in a first direction, wherein the second plurality of parallel wires is oriented in a second direction that is not parallel to the first direction, and wherein a second groove width of the grooves is equal to a second wire spacing distance between adjacent ones of the second plurality of parallel wires.

20. The multi-layer structural component according to claim 19, wherein the first groove width is not equal to the second groove width.

\* \* \* \* \*